(12) United States Patent
Edwards

(10) Patent No.: US 7,410,197 B2
(45) Date of Patent: Aug. 12, 2008

(54) BAG DISPENSER ATTACHABLE TO A LEASH HAVING LIGHTING MECHANISM AND OPTIONAL SCOOP

(75) Inventor: Timothy Edwards, Del Mar, CA (US)

(73) Assignee: RPG Bags, LLC, Irving, TX (US)

( * ) Notice: Subject to any disclaimer, the term of this patent is extended or adjusted under 35 U.S.C. 154(b) by 354 days.

(21) Appl. No.: 11/164,221

(22) Filed: Nov. 15, 2005

(65) Prior Publication Data

US 2007/0108781 A1    May 17, 2007

(51) Int. Cl.
A01K 29/00 (2006.01)
E01H 1/12 (2006.01)
(52) U.S. Cl. ...................................................... 294/1.3
(58) Field of Classification Search ................. 294/1.3, 294/1.4, 1.5; 119/161
See application file for complete search history.

(56) References Cited

U.S. PATENT DOCUMENTS

| | | | |
|---|---|---|---|
| 2,652,054 A | 9/1953 | Bishop | |
| 3,744,453 A * | 7/1973 | Deitch | 294/1.5 |
| 4,095,729 A | 6/1978 | Butera | |
| 4,516,676 A | 5/1985 | Cournoyer | |
| 4,538,727 A | 9/1985 | Solloway | |
| 4,738,385 A | 4/1988 | Bell | |
| 4,819,977 A * | 4/1989 | Cooper | 294/1.4 |
| 4,878,703 A * | 11/1989 | Yoshioka | 294/1.5 |
| 5,050,760 A | 9/1991 | Garcia | |
| 5,064,233 A | 11/1991 | Sloan | |
| 5,135,134 A | 8/1992 | Dancy | |
| 5,265,785 A | 11/1993 | Chudy | |
| 5,363,809 A | 11/1994 | Roe | |
| 5,377,626 A | 1/1995 | Kilsby et al. | |
| 5,441,017 A | 8/1995 | Lindsay | |
| 5,540,469 A | 7/1996 | Albert | |
| 5,611,455 A | 3/1997 | McCreary | |
| 5,669,645 A * | 9/1997 | Chuang | 294/1.3 |
| 5,680,978 A | 10/1997 | Pinion | |
| 5,727,500 A | 3/1998 | Conboy | |
| 5,819,984 A | 10/1998 | Krueger | |
| 6,019,067 A | 2/2000 | Carey | |
| 6,035,809 A | 3/2000 | Fingerett et al. | |
| 6,073,590 A | 6/2000 | Polding | |
| 6,076,717 A | 6/2000 | Edwards et al. | |
| 6,085,695 A | 7/2000 | Miller et al. | |
| 6,223,695 B1 | 5/2001 | Edwards et al. | |
| 6,240,881 B1 | 6/2001 | Edwards et al. | |
| 6,941,896 B1 * | 9/2005 | Morin | 119/867 |
| 2005/0264016 A1 * | 12/2005 | Davis | 294/1.3 |

FOREIGN PATENT DOCUMENTS

WO    WO 93/13268    *    7/1993

* cited by examiner

Primary Examiner—Dean J Kramer
(74) Attorney, Agent, or Firm—Locke Lord Bissell & Liddell LLP

(57) ABSTRACT

A pet refuse bag dispenser includes a housing having an inner cavity for storing a plurality of bags therein. A lamp provides light to an area from which pet refuse is collected and a battery is associated with the lamp. A switch controls electrical connection between the lamp and battery. The housing includes recess for receiving the lamp. The bag dispenser may include an optional scooper associated with the housing and configured to provide a frame with which a bag is associated to facilitate the collection of pet refuse within the bag.

15 Claims, 4 Drawing Sheets

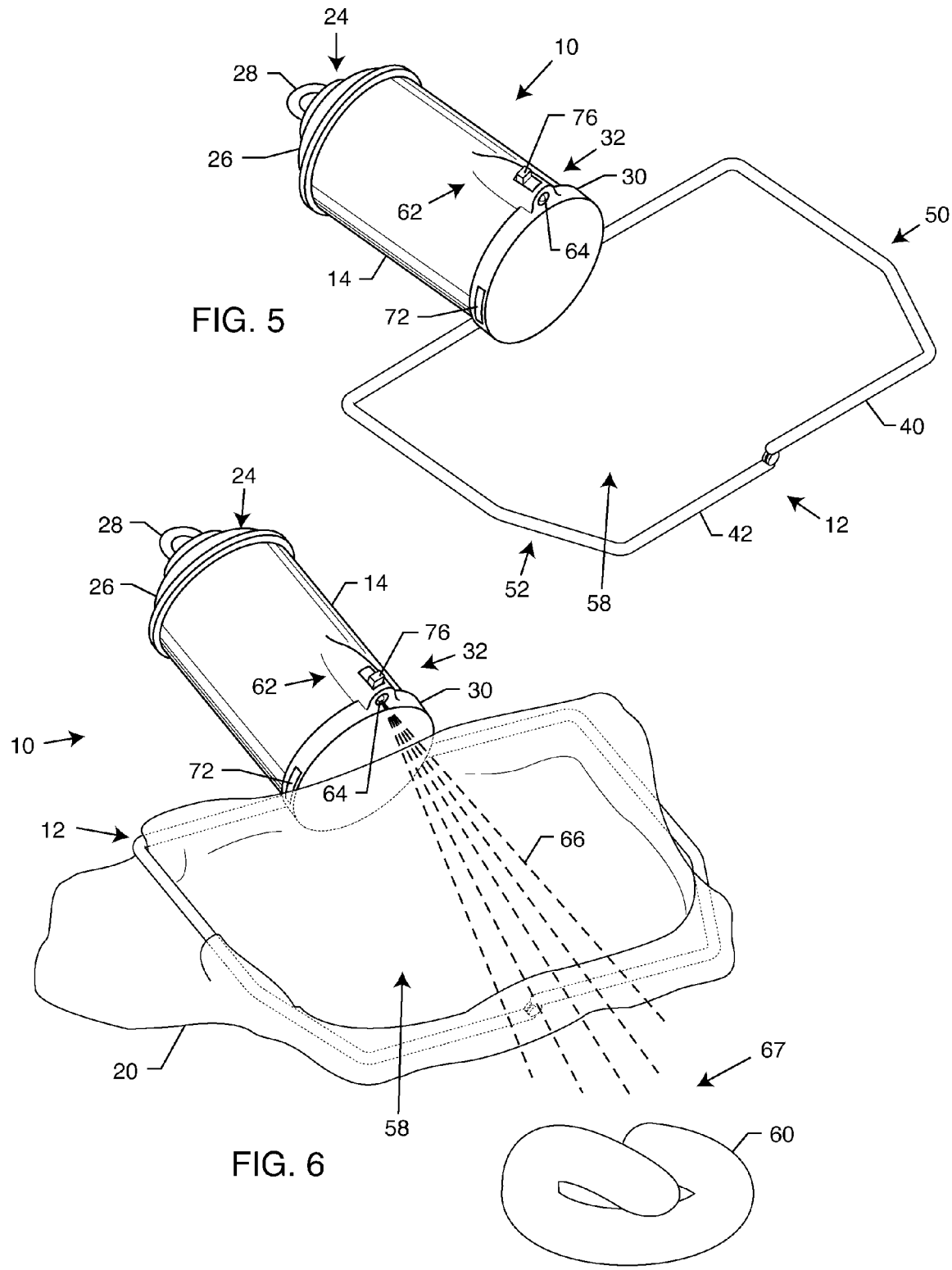

BAG DISPENSER ATTACHABLE TO A LEASH HAVING LIGHTING MECHANISM AND OPTIONAL SCOOP

BACKGROUND OF THE INVENTION

The present invention relates in general to devices for collecting animal litter. More particularly, the present invention relates to a dispenser of bags for collecting animal litter.

The rapid increase of urban population coupled with the increasing popularity of dogs and other pets has created a serious sanitary problem in connection with the disposal of animal litter, and particularly canine litter. Because many pet owners have permitted their animals to deposit solid excrement on both private and public property, a number of communities have enacted ordinances requiring pet owners, under penalty of fine, to retrieve and dispose of litter created by their pets.

It has been found that the willingness of pet owners to retrieve and properly dispose of animal litter is related to the ease, convenience and economy with which the litter may be handled in a clean and sanitary manner. While a number of devices have been proposed for the purpose of disposing of animal litter, they have suffered from various shortcomings. Some devices are not completely disposable and, therefore, require some degree of cleanup. Other types of devices, both of the disposable and reusable varieties, are awkward and/or conspicuous to carry. Moreover, some prior animal litter collection devices are too expensive for everyday use.

One commonly accepted method for collecting and storing animal litter until a proper disposal site can be found involves the use of a disposable plastic bag. Some pet owners will simply place a plastic bag, such as a plastic grocery bag, in a clothing pocket for retrieval when needed. This method of collecting animal litter presupposes, however, that the pet owner will always have access to and remember to grab a plastic bag prior to walking the pet. There have been proposals to provide devices which would store plastic bags within a container that may be worn by the owner or the pet. Each of these prior devices, however, suffers several disadvantages which the present invention is intended to overcome.

The retractable leash has been gaining popularity for the last twenty years and has taken its place as a permanent pet product. Some have recognized the desirability of providing an easy way to carry pet waste cleanup bags when going for a walk utilizing such a retractable leash. For example, U.S. Pat. No. 5,540,469 discloses a retractable leash placed into an animal waste collecting device which incorporates its own handle, bag holder and flashlight. It is believed, however, that such an assembly involves apparatus and associated costs which are undesirable.

Accordingly, there is a need for a bag dispenser which provides access to bags when needed. There is a further need for a bag dispenser which provides a scooper for use in conjunction with the bags. Additionally, there is a need for a scooper that illuminates an area from which waste is to be collected when lighting conditions are poor. The present invention fulfills these needs and provides other related advantages.

SUMMARY OF THE INVENTION

The present invention resides in a bag dispenser which provides a scooper for use in conjunction with the bags, and which illuminates the area from which waste is to be collected when lighting conditions are poor. The bag dispenser includes a housing having an inner cavity for storing a plurality of bags therein, a lamp for providing light to an area from which pet refuse is collected, and a battery associated with the lamp. A switch controls the electrical connection between the lamp and battery. The housing includes a recess for receiving the lamp. An aperture permits access to the inner cavity, and the bags are individually removable from the housing through the aperture.

The bag dispenser further includes a scooper associated with the housing and configured to provide a frame with which a bag is associated to facilitate the collection of pet refuse within the bag. The scooper moves relative to the housing between a storage position and an operative position. In an embodiment of the present invention, the scooper pivots relative to the housing between the storage position and the operative position. The scooper is also disposed about the housing in the storage position and extends outwardly from the housing in the operative position.

The housing includes a means for retaining the scooper in the storage position. In an embodiment of the present invention, the scooper is retained in the storage position via an interference-fit detent on the housing for receiving a portion of the frame. The housing also includes a means for retaining the scooper in the operative position. Such may be accomplished via an interference-fit detent on the housing for receiving a portion of the frame.

The frame defines a central aperture. Placement of the bag over the frame allows waste positioned on a portion of the bag over the central aperture to bear down on the bag and cause the bag to invert as the bag moves through the central aperture.

The bag dispenser also includes a means for folding the frame into two portions. The frame pivots relative to the housing, and is movable to an intermediate position between the storage position and the operative position. The frame is folded via pivotal movement of the frame between the intermediate and operative positions, and the housing includes means for retaining the frame in the intermediate position.

A removable closure encloses an open end of the housing, and includes an attachment means extending outwardly therefrom for connecting the dispenser to a leash. The closure includes means for retaining the scooper in a storage position in the form of a detent associated with the housing for receiving a portion of the scooper in friction-fit engagement.

In an embodiment of the present invention, the lamp is an integral part of the housing of the dispenser and the battery is disposed within the housing.

In another embodiment of the present invention, the housing includes a means for retaining the lamp in a storage position where the lamp comprises a flashlight that engages the housing in the storage position.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 5 is a rotated rear perspective view of the bag dispenser of FIG. 1 showing the unfolded scooper in the operative position;

FIG. 6 is the bag dispenser of FIG. 5 showing the unfolded scooper in the operative position, positioned adjacent animal waste, a bag positioned on the scooper, and a lamp illuminating the area the animal waste is to be collected from;

DETAILED DESCRIPTION OF THE PREFERRED EMBODIMENTS

Figure 1:
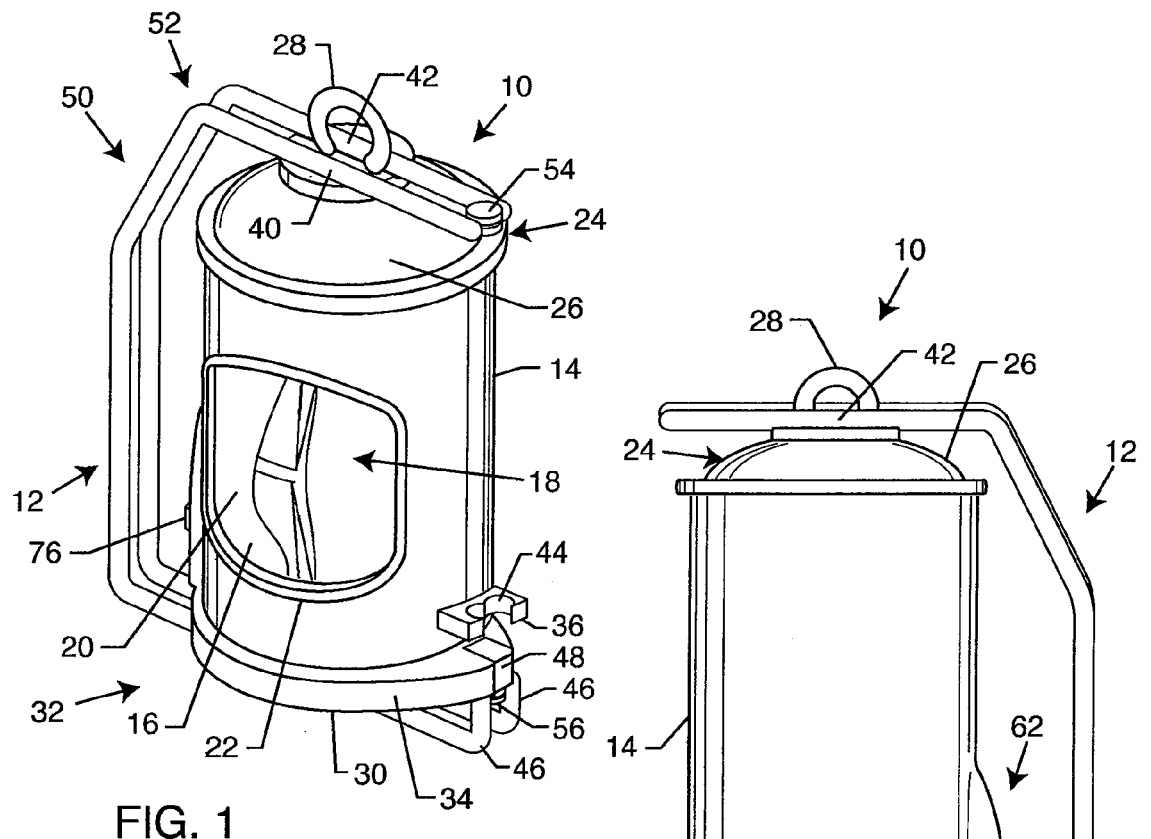
FIG. 1 is a front perspective view of a bag dispenser embodying the present invention with a folded scooper shown in a storage position.
Figure 2:
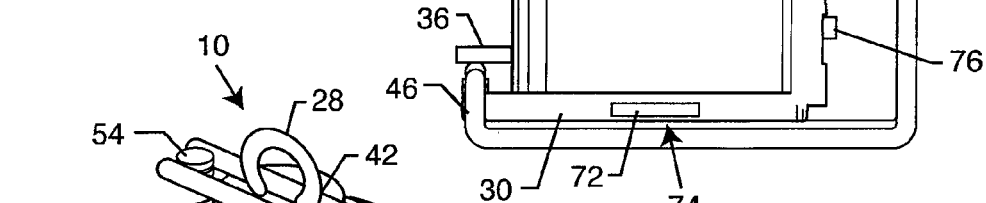
FIG. 2 is a rear elevation view of the bag dispenser of FIG. 1.
Figure 3:
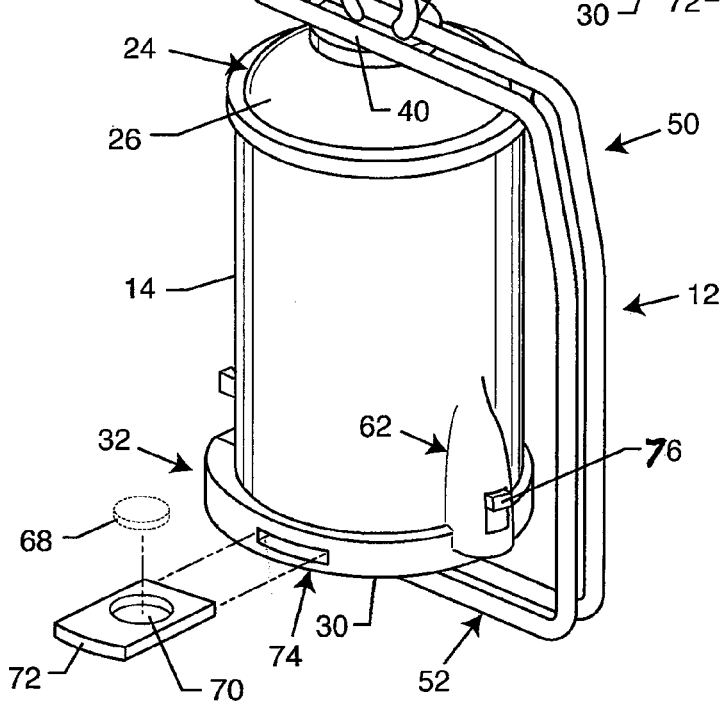
FIG. 3 is a rear perspective view of the bag dispenser of FIG. 1 showing the battery and battery holder removed from a battery slot in the housing of the bag dispenser.

As shown in FIGS. 1-6, the present invention resides in a bag dispenser 10 with an associated lighting mechanism and optional scooper frame 12. For reasons of simplicity, only the embodiment incorporating the scooper frame 12 is illustrated since an embodiment of the bag dispenser 10 without the scooper frame 12 and its associated supporting features would otherwise be identical.

The bag dispenser 10 includes a generally cylindrical housing 14 defining an inner cavity 16 for holding a roll 18 of plastic bags 20 within. The bags 20 are connected end-to-end and wound about a tubular axle (not shown).

The housing 14 has an aperture 22 in a sidewall of the housing 14 which permits access to the inner cavity 16. The roll 18 of plastic bags 20 is disposed within the inner cavity 16 of the housing 14 such that the bags 20 may be individually removed therefrom through the aperture 22 in the housing 14. The roll 18 of plastic bags 20 may be inserted into and disposed within the inner cavity 16 through an upper open end (not shown) of the housing 14.

A closure 24, in the form of a cap or lid, is interference-fit connected to the housing 14. The closure 24 encloses the upper open end of the housing 14. The closure 24 includes a generally circular flange 26 having a loop or bracket 28 extending upwardly and outwardly therefrom for connecting the bag dispenser 10 to a leash (not shown) or the like.

The housing 14 includes an annular flange 30 extending about an end 32 of the housing 14. A portion 34 of the annular flange 30 extends outwardly away from the housing 14. A side flange 36 extends outwardly from a side of the housing 14 a short distance from the portion 34 of the annular flange 30.

Figure 4:
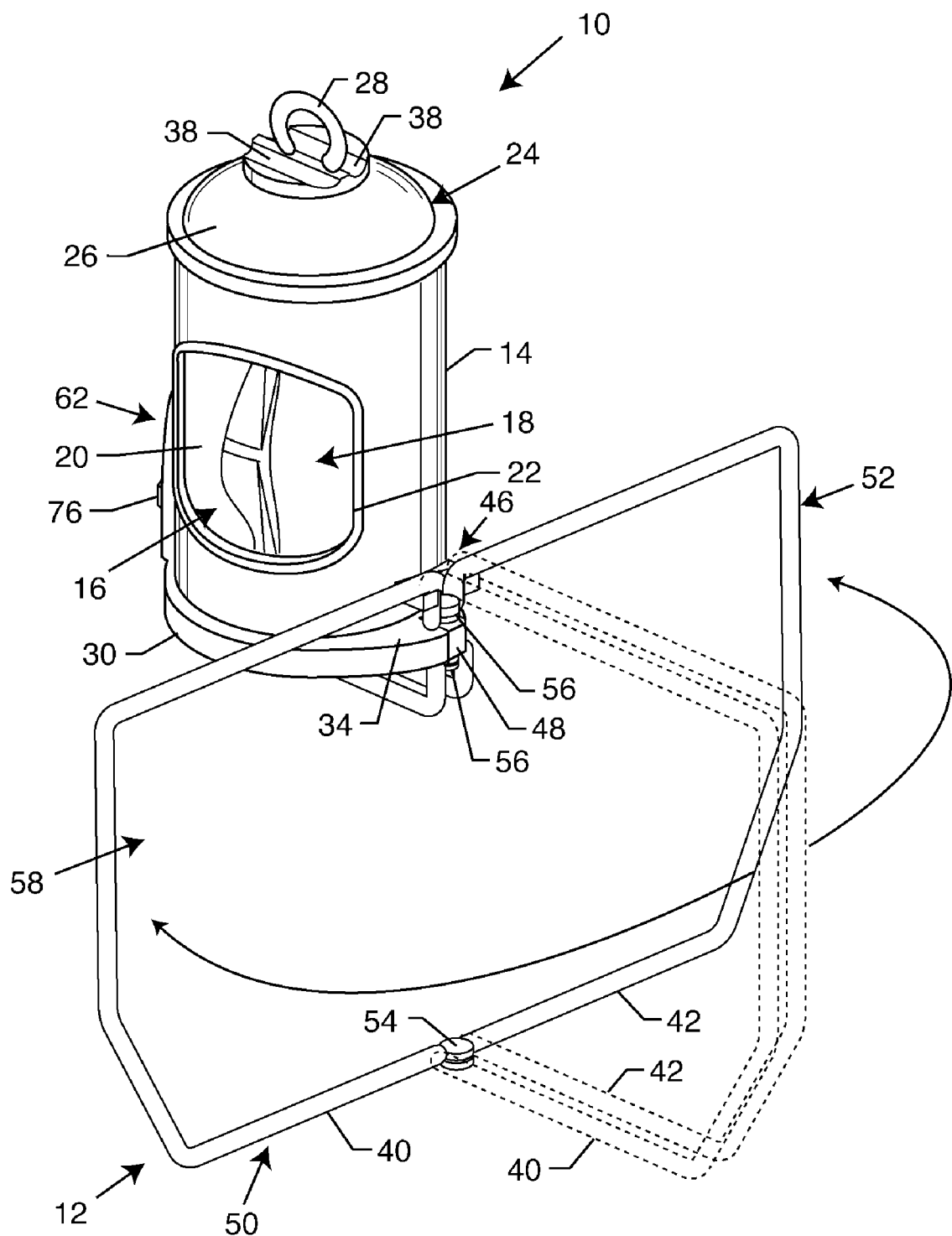
FIG. 4 is a front perspective view of the bag dispenser of FIG. 1 showing the folded scooper being pivotally moved from the storage position to an intermediate position and pivotally unfolded from the intermediate position to an operative position where the scooper is unfolded.

The scooper frame 12 is pivotally connected to the housing 14 at the portion 34 of the annular flange 30. The scooper frame 12 is movable between a folded position (FIGS. 1-3) and an unfolded position (FIGS. 4-6). When the scooper frame 12 is in the unfolded position, the scooper frame 12 is, overall, generally rectangular in shape if not a perfect rectangle (e.g., the scooper frame 12 shown in FIGS. 1-6 is hexagonal). The scooper frame 12 may be made from a variety of materials including, without limitation, metal (e.g., steel, aluminum or the like), plastic or the like. The frame 12 is preferably made of circular metal rods bent into the desired shape.

The scooper frame 12 is pivotally movable, relative to the housing 14, between a storage position where the frame 12 is disposed about the housing 14 and an operative position where the frame 12 extends outwardly from the end 32 of the housing 14. The housing 14 retains the scooper frame 12 in the storage position using a pair of interference-fit grooves or detents 38 located on the closure 24, on either side of the loop 28, that are sized and shaped for receiving portions 40, 42 of the frame 12.

The side flange 36 includes a pair of snap-fit interference detents 44 engaging portions 46 of the scooper frame 12 when the scooper frame 12 is pivoted from the storage position, the scooper frame 12 folded to an intermediate position where the scooper frame 12 extends away from the housing 14 and the detents 44 engage portions 46 of the scooper frame 12 to hold the scooper frame 12 in the intermediate position so that the scooper frame 12 may be unfolded. A pair of spring-loaded pins (not shown), located on a flange portion 48 of the scooper frame 12, extend through a respective pair of apertures (not shown) within the portion 34 of the annular flange 30 in order to allow the scooper frame 12 to pivot between the storage and intermediate positions. The scooper frame 12 includes two mirror image halves 50, 52 connected by hinges 54, 56 at each end of the halves 50, 52. An end of one of the hinges 56 is connected to the flange portion 48 of the scooper frame 12. In the storage position, the frame 12 is interference-fit retained by the detents 38 when the frame 12 is disposed about the housing 14. A user pulls on the frame 12 to release the portions 40, 42 of the frame 12 from the detents 38 and pivots the frame 12 about the housing 14 approximately one hundred eighty degrees to the intermediate position where the scooper frame 12 engages the detents 44 of the side flange 36.

The construction of the hinges 54, 56 prevents the halves 50, 52 of the scooper frame 12 from being able to pivotally unfold beyond the operative position.

The retention of the scooper frame 12 within the detents 44 of the side flange 36 allows the scooper frame 12 to be unfolded. The user pivots the halves 50, 52 of the frame 12 relative to each other until the scooper frame 12 is in the unfolded, operative position. The scooper frame 12 is configured to provide a framework with which a bag 20 is associated to facilitate the collection of waste within the bag 20. The scooper frame 12 is moved from the operative position to the storage position by reversing the steps described above.

The frame 12 defines a central aperture 58. Placement of the bag 20 over the frame 12 allows animal waste 60 positioned on a portion of the bag 20 over the central aperture 58 to bear down on the bag 20 and cause the bag 20 to invert as the bag 20 moves through the central aperture 58.

In use, a user removes a bag 20 from the bag dispenser 10, opens the bag 20, and places a hand holding the bag dispenser 10 into the plastic bag 20 being held in the user's other hand. The user then positions the bag dispenser 10 (or at least the scooper frame 12) within the plastic bag 20, preferably near a central portion of a closed end of the bag 20. Using the hand that had been holding the plastic bag 20, the user pushes a portion of the plastic bag 20 through the central aperture 58 of the scooper frame 12 to create a receptacle for receiving waste 60. A user then scoops the waste 60 into the receptacle formed by the bag 20 and frame aperture 58. With the waste 60 in the receptacle, the user inverts the plastic bag 20 so that the weight of the waste 60 pulls the inverted bag 20 through the aperture 58. The user then grips the inverted plastic bag 20 with their free hand and pulls the bag 20 free from the scooper frame 12.

The lighting mechanism, in the form of a lamp or flashlight 62 is part of the housing 14 of the bag dispenser 10 such that the flashlight 62 is an integral part of the dispenser 10 with the housing 14 also serving as the housing of the flashlight 62. The flashlight 62 includes a lamp 64 for providing light 66 to an area 67 from which the waste 60 is being collected, the lamp 64 being incorporated into a recess formed within the housing 14. The lamp 64 is electrically connected to a disk battery 68 disposed within the housing 14. The battery 68 is held within a receptacle 70 of a battery holder 72. The battery holder 72 fits within a slot 74 located on the annular flange 30 of the housing 14. The battery 68 is electrically connected to the lamp 64. Alternatively, a AAA battery may be used with an appropriately shaped and sized receptacle for receiving the battery in the housing 14. The flashlight 62 also includes a switch 76 that regulates the electrical connection between the lamp 64 and battery 68. This switch 76 may break the electrical connection between the lamp 64 and the battery 68, control the amount of electrical current reaching the lamp 64 from the battery, etc. Various types of switches 76 may be used including, without limitation, a sliding on/off switch, a push button on/off switch, a dimmer switch or the like. The lamp 64 may use various light sources including, without limitation, an incandescent bulb, a light emitting diode, a fluorescent tube or the like.

Figure 7:
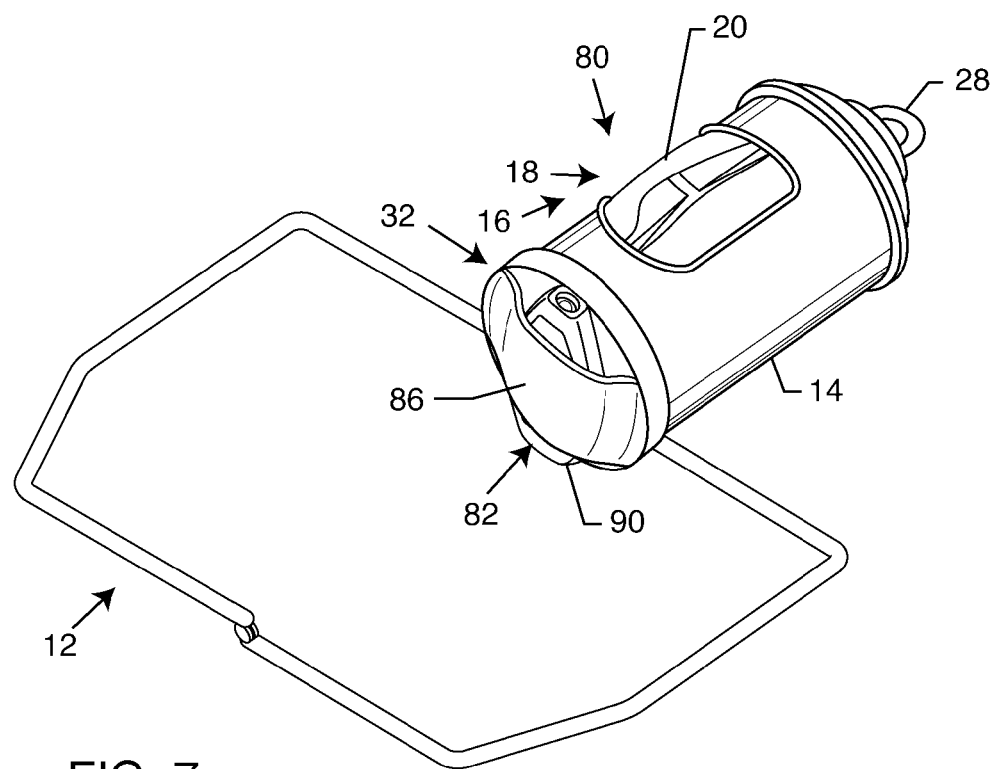
FIG. 7 is a is a perspective view of another bag dispenser embodying the present invention showing an unfolded scooper in an operative position with a removably attachable flashlight engaging the dispenser.
Figure 8:
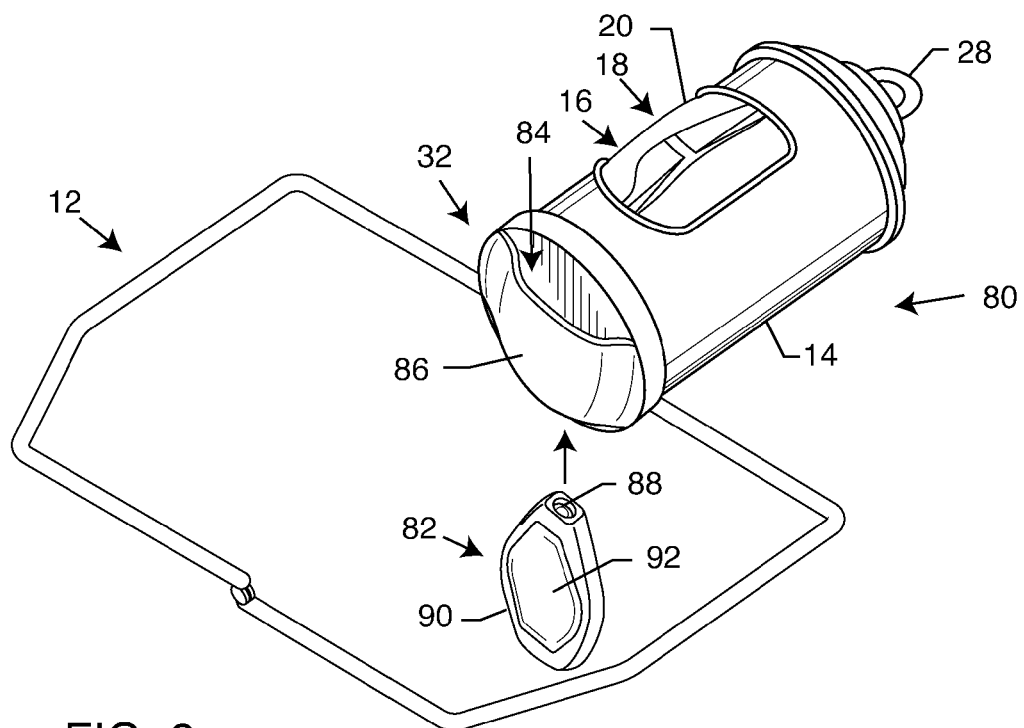
FIG. 8 is the bag dispenser of FIG. 7 showing the unfolded scooper in the operative position, with the flashlight disengaged from the dispenser.

As shown in FIGS. 7 and 8, another embodiment of the present invention resides in a bag dispenser 80 that is similar, if not identical, to the dispenser 10 of FIGS. 1-6 except for the dispenser 80 having an associated removably attachable lighting mechanism 82 in the form of a flashlight. The flashlight 82 is held within a recess 84 of the dispenser 80 formed by a band 86 extending across the end 32 of the housing 14. The flashlight 82 includes a lamp 88 that can provide light to an area from which animal waste is being collected when the flashlight 82 is removed from the dispenser 80 and aimed at the area the waste is located in. The lamp 88 is electrically connected to a battery (not shown) including, without limitation, a disk battery, AAA battery, AA battery or the like disposed within a housing 90 of the flashlight 82. The flashlight 62 also includes a switch 92 that regulates the electrical connection between the lamp 88 and battery. This switch 92 creates an electrical connection between the lamp 88 and the battery, controlling the amount of electrical current reaching the lamp 88 from the battery, etc., when the switch 92 is depressed by a user. The lamp 88 may use various light sources including, without limitation, an incandescent bulb, a light emitting diode, a fluorescent tube or the like.

The bag dispensers 10, 80 and their various components may be made of a variety of materials including, without limitation, metal, plastic or the like.

The bag dispensers 10, 80 are intended to be utilized in connection with a collar, harness or a leash device (not shown) commonly utilized when walking one's pet. The bag dispensers 10, 80 may also be attached to a key chain (not shown) or the like. The leash device may be simple leather or chain leash or a leash device that incorporates a retractable leash that extends from a housing.

Although more than one embodiment has been described in detail for purposes of illustration, various modifications may be made without departing from the scope and spirit of the invention.

What is claimed is:

1. A pet refuse bag dispenser, comprising:
a housing having an inner cavity for storing a plurality of bags therein, including a scooper associated with the housing and configured to provide a frame with which a bag is associated to facilitate the collection of pet refuse within the bag, wherein the scooper is movable relative to the housing between a storage position and an operative position and wherein the scooper is disposed about the housing in the storage position, and extends outwardly from the housing in the operative position;
a lamp associated with the housing for providing light to an area from which pet refuse is collected;
a battery associated with the lamp;
a switch for controlling electrical connection between the lamp and battery;
wherein the housing includes a recess for receiving the lamp.

2. A pet refuse bag dispenser, comprising:
a housing having an inner cavity for storing a plurality of bans therein, including a scooper associated with the housing and configured to provide a frame with which a bag is associated to facilitate the collection of pet refuse within the bag, wherein the housing includes means for retaining the scooper in a storage position and wherein the storage position retaining means includes an interference-fit detent on the housing for receiving a portion of the frame;
a lamp associated with the housing for providing light to an area from which pet refuse is collected;
a battery associated with the lamp;
a switch for controlling electrical connection between the lamp and battery;
wherein the housing includes a recess for receiving the lamp.

3. A pet refuse bag dispenser, comprising:
a housing having an inner cavity for storing a plurality of bags therein, including a scooper associated with the housing and configured to provide a frame with which a bag is associated to facilitate the collection of pet refuse within the bag, wherein the housing includes means for retaining the scooper in an operative position and wherein the operative position retaining means includes at least one interference-fit detent on the housing for receiving a portion of the frame;
a lamp associated with the housing for providing light to an area from which pet refuse is collected;
a battery associated with the lamp;
a switch for controlling electrical connection between the lamp and battery;
wherein the housing includes a recess for receiving the lamp.

4. A pet refuse bag dispenser, comprising:
a housing having an inner cavity for storing a plurality of bags therein, including a scooper associated with the housing and configured to provide a frame with which a bag is associated to facilitate the collection of pet refuse within the bag, wherein the frame defines a central aperture, and wherein placement of the bag over the frame allows waste positioned on a portion of the bag over the central aperture to bear down on the bag and cause the bag to invert as the bag moves through the central aperture;
a lamp associated with the housing for providing light to an area from which pet refuse is collected;

a battery associated with the lamp;

a switch for controlling electrical connection between the lamp and battery;

wherein the housing includes a recess for receiving the lamp.

5. A pet refuse bag dispenser, comprising:

a housing having an inner cavity for storing a plurality of bans therein;

a removable closure for enclosing an open end of the housing, the closure including means for retaining a scooper in a storage position, and the retaining means including a detent associated with the housing for receiving a portion of the scooper in friction-fit engagement;

a lamp associated with the housing for providing light to an area from which pet refuse is collected;

a battery associated with the lamp;

a switch for controlling electrical connection between the lamp and battery;

wherein the housing includes a recess for receiving the lamp.

6. A pet refuse bag dispenser, comprising:

a housing having an inner cavity for storing a plurality of bags therein and an aperture which permits access to the inner cavity, the bags being individually removable from the housing through the aperture;

a scooper associated with the housing and configured to provide a frame with which a bag is associated to facilitate the collection of pet refuse within the bag, the scooper moving relative to the housing between a storage position and an operative position, wherein the frame defines a central aperture, and wherein placement of the bag over the frame in the operative position allows waste positioned on a portion of the bag over the central aperture to bear down on the bag and cause the bag to invert as the bag moves through the central aperture;

a lamp for providing light to an area from which pet refuse is collected;

a battery associated with the lamp; and a switch for controlling electrical connection between the lamp and battery;

wherein the housing includes a recess for receiving the lamp.

7. The bag dispenser of claim 6, wherein the scooper pivots relative to the housing between the storage position and the operative position, the scooper being disposed about the housing in the storage position and extending outwardly from the housing in the operative position.

8. The bag dispenser of claim 6, wherein the housing includes means for retaining the scooper in the storage position that includes an interference-fit detent on the housing for receiving a portion of the frame, and means for retaining the scooper in the operative position that includes at least one interference-fit detent on the housing for receiving a portion of the frame.

9. The bag dispenser of claim 6, including means for folding the frame into two portions, the frame pivoting relative to the housing and being pivotable to an intermediate position between the storage position and the operative position, the folding means providing pivot movement of the frame between the intermediate and operative positions, and wherein the housing includes means for retaining the frame in the intermediate position.

10. The bag dispenser of claim 6, including a removable closure for enclosing an open end of the housing that includes an attachment means extending outwardly therefrom for connecting the dispenser to a leash and means for retaining the scooper in a storage position that includes a detent associated with the housing for receiving a portion of the scooper in friction-fit engagement.

11. The bag dispenser of claim 6, wherein the battery is disposed within the housing.

12. The bag dispenser of claim 6, wherein the housing includes means for retaining the lamp in a storage position within the recess.

13. The bag dispenser of claim 12, wherein the lamp comprises a flashlight engaging the housing in the storage position.

14. A pet refuse bag dispenser, comprising:

a housing having an inner cavity for storing a plurality of bags therein and an aperture which permits access to the inner cavity, the bags being individually removable from the housing through the aperture;

a scooper associated with the housing and configured to provide a frame with which a bag is associated to facilitate the collection of pet refuse within the bag, the scooper pivoting relative to the housing between a storage position and an operative position, the scooper being disposed about the housing in the storage position and extending outwardly from the housing in the operative position, wherein the frame defines a central aperture, and wherein placement of the bag over the frame in the operative position allows waste positioned on a portion of the bag over the central aperture to bear down on the bag and cause the bag to invert as the bag moves through the central aperture;

an interference-fit detent on the housing for receiving a portion of the frame in the storage position;

an interference-fit detent on the housing for receiving a portion of the frame in the operative position;

a battery disposed within the housing;

a lamp for providing light to an area from which pet refuse is collected;

a switch for controlling electrical connection between the lamp and battery;

means for folding the frame into two portions, the frame pivoting relative to the housing and being pivotable to an intermediate position between the storage position and the operative position, the folding means providing pivot movement of the frame between the intermediate and operative positions;

means for retaining the frame in the intermediate position; and means for attaching the bag dispenser to a leash.

15. A pet refuse bag dispenser, comprising:

a housing having an inner cavity for storing a plurality of bags therein and an aperture which permits access to the inner cavity, the bags being individually removable from the housing through the aperture;

a scooper associated with the housing and configured to provide a frame with which a bag is associated to facilitate the collection of pet refuse within the bag, the scooper pivoting relative to the housing between a storage position and an operative position, the scooper being disposed about the housing in the storage position and extending outwardly from the housing in the operative position, wherein the frame defines a central aperture, and wherein placement of the bag over the frame in the operative position allows waste positioned on a portion of the bag over the central aperture to bear down on the bag and cause the bag to invert as the bag moves through the central aperture;

an interference-fit detent on the housing for receiving a portion of the frame in the storage position;

an interference-fit detent on the housing for receiving a portion of the frame in the operative position;

a flashlight for providing light to an area from which pet refuse is collected;

means for folding the frame into two portions, the frame pivoting relative to the housing and being pivotable to an intermediate position between the storage position and the operative position, the folding means providing pivot movement of the frame between the intermediate and operative positions;

means for retaining the frame in the intermediate position;

means for attaching the bag dispenser to a leash; and means for attaching the flashlight in a storage position engaging the housing.

* * * * *